United States Patent [19]
Heffner

[11] Patent Number: 5,923,476
[45] Date of Patent: Jul. 13, 1999

[54] OPTICAL VIEWER WITH AN APERTURE TRANSFORMER

[75] Inventor: Brian L. Heffner, Los Altos, Calif.

[73] Assignee: Hewlett-Packard Company, Palo Alto, Calif.

[21] Appl. No.: 09/007,917

[22] Filed: Jan. 16, 1998

[51] Int. Cl.⁶ .................................................. G02B 27/14
[52] U.S. Cl. ......................................................... 359/630
[58] Field of Search .................................... 359/630, 631, 359/633, 627; 345/7, 8, 9; 348/115

[56] References Cited

U.S. PATENT DOCUMENTS 4,220,400  9/1980  Vizenor ..................................... 359/631
4,806,011  2/1989  Bettinger ................................. 351/158

Primary Examiner—Georgia Epps
Assistant Examiner—Ricky Mack

[57] ABSTRACT

An optical system for reflecting light from a display screen into an aperture which is typically the pupil of a person wearing a head-mounted display system in which the display screen is mounted to the side of the viewer's eye. The optical system includes a turning optical assembly having a plurality of planar facets disposed on a curved surface opposite to the aperture, the planes of the facets being parallel to one another. Light from the display entering an input port impinges on the facets such that the light is reflected by the facets into the aperture. The curved surface has a curvature chosen such that the fill factor for each of the facets is substantially the same as that for the others of the facets. In one embodiment of the present invention, the curved surface is a cylinder having a hyperbolic cross-section.

7 Claims, 3 Drawing Sheets

OPTICAL VIEWER WITH AN APERTURE TRANSFORMER

FIELD OF THE INVENTION

The present invention relates to display systems, and more particularly, to head mounted display systems for projecting a computer generated image into the eyes of a person wearing the display system.

BACKGROUND OF THE INVENTION

Head-mounted computer displays may be viewed as "eye glasses" that are worn by the user to view images created by a computer. The image seen by each eye is generated on a display screen having a two dimensional array of pixels. If the display screen is placed in front of the viewer's eyes, the resulting device extends outward from the viewer's face. This leads to a bulky display, which is objectionable both because of its size and weight.

To reduce the size and weight of the portion of the display that extends in front of the wearer's eyes, designs in which the display is mounted on the side of the glasses have been suggested. By mounting the display on the supports that extend over the wearer's ears, the weight is supported by the wearer's ears and nose, thus reducing the weight and bulk that is cantilevered in front of the wearer's nose.

For this type of design to be successful in reducing the weight and bulk of the portion of the display that extends out past the viewer's nose, some form of "turning optic" is needed in front of the user's eyes to reflect the image generated by the display screen back into the user's pupils. The simplest form of turning optic would be a mirror that reflects the light generated by the display and imaging optics back into the eye. However, it can be shown that such an optical system would protrude forward from the face by approximately 3 cm or more. While this is an improvement over systems in which the display is placed in front of the viewer's face, it would be advantageous to reduce this thickness further.

Broadly, it is the object of the present invention to provide an improved turning optical arrangement for use with head mounted displays and the like.

It is a further object of the present invention to provide a turning optical arrangement that is less than half of an inch in thickness.

These and other objects of the present invention will become apparent to those skilled in the art from the following detailed description of the invention and the accompanying drawings.

SUMMARY OF THE INVENTION

The present invention is an optical system for reflecting light from a display screen into an aperture which is typically the pupil of a person wearing a head-mounted display system in which the display screen is mounted to the side of the viewer's eye. The optical system includes a turning optical assembly having a plurality of planar facets disposed on a surface opposite to the aperture. The planes of the facets are parallel to one another. In the preferred embodiment of the present invention the surface is curved. Light from the display entering an input port impinges on the facets such that the light is reflected by the facets into the aperture. The curved surface has a curvature chosen such that the fill factor for each of the facets is substantially the same as that for the others of the facets. In one embodiment of the present invention, the curved surface is a cylinder having a hyperbolic cross-section.

DETAILED DESCRIPTION OF THE INVENTION

Figure 1:
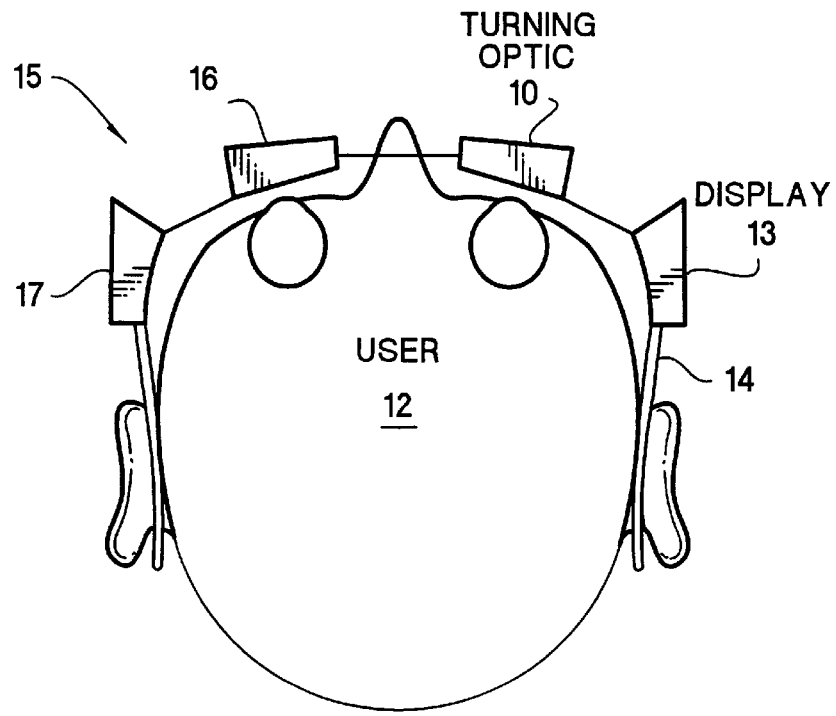
FIG. 1 is cross-sectional view of a head-mounted display on a user.
Figure 2:
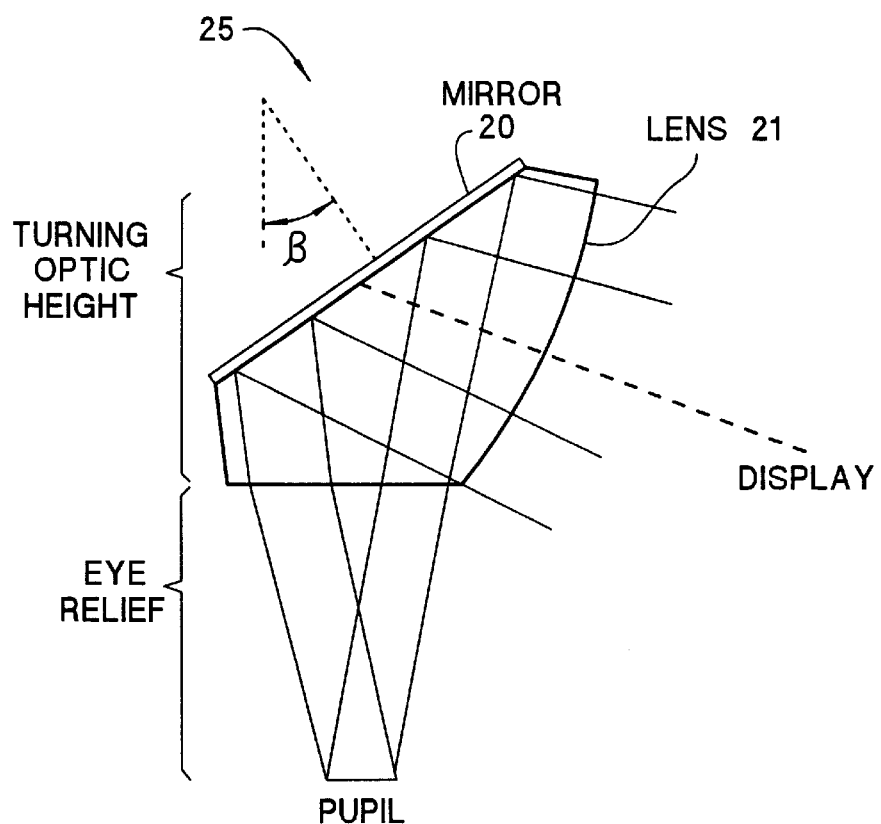
FIG. 2 is a cross-sectional view of turning optical assembly.

The manner in which the present invention provides its advantages can be more easily understood with reference to FIG. 1. FIG. 1 illustrates the manner in which a side-mounted display screens shown at 13 and 17 are viewed by a user 12 of a head mounted display 15 having displays 13 and 17 and turning optical assemblies 10 and 16 mounted on a frame 14. Light from the display screen 13 is reflected into the wearer's eyes by turning optical assembly 10. One such optical assembly is mounted in front of each eye. To simplify the following discussion, an optical assembly for reflecting light into an aperture will be referred to as a "turning optic". The simplest form of turning optic is shown in FIG. 2 at 25. The turning optic 25 is a convex lens with a mirror 20 for reflecting the light generated by the display into the user's eye. The convex lens surface is shown at 21. It can be shown that for a typical field of view and for typical pupil and eye relief distances, the thickness of the turning optic must be approximately 3 cm. As noted above, it would be advantageous to reduce this thickness. It should be noted that the lens may be viewed as being part of the imaging optics associated with the display instead of part of the turning optic.

Figure 3:
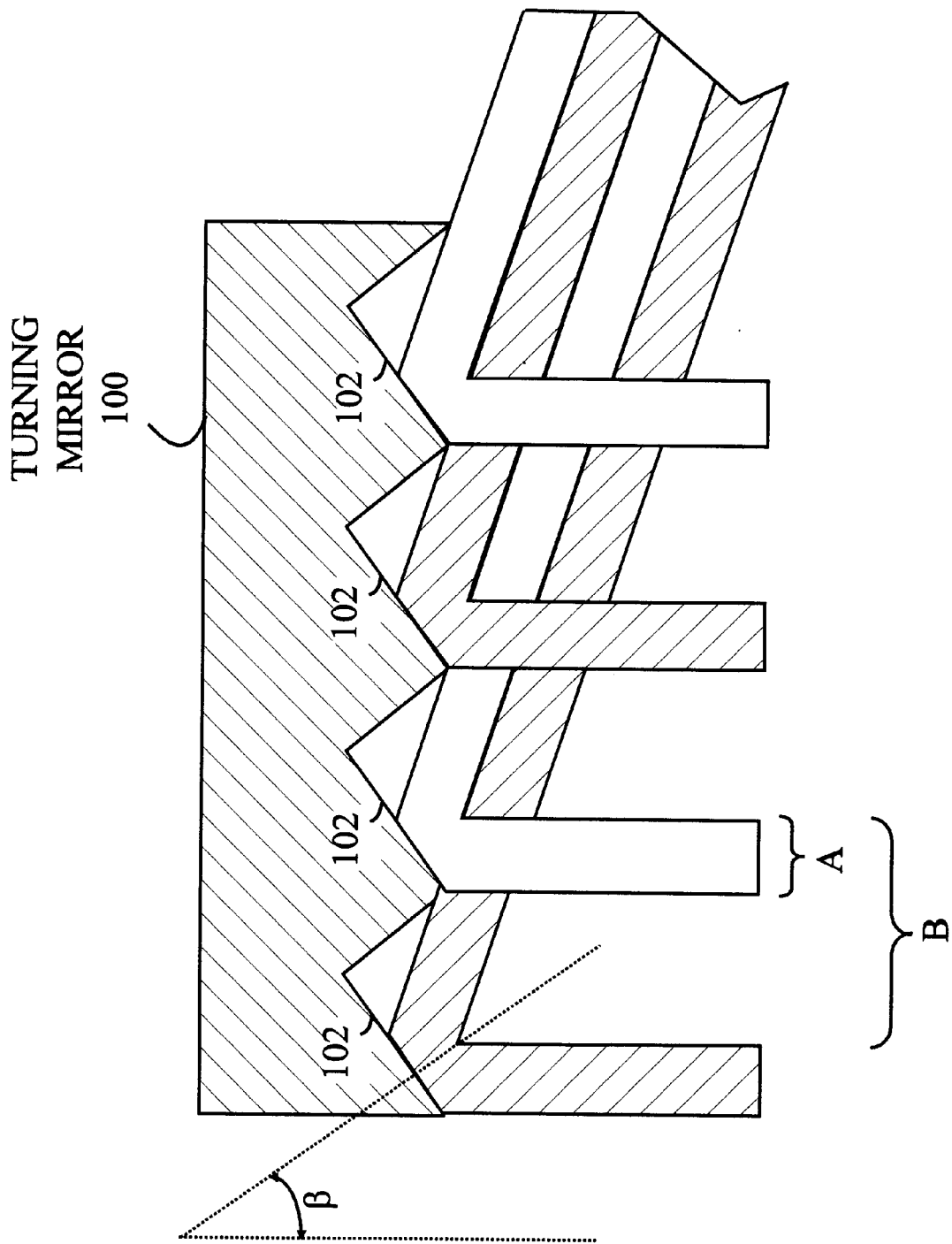
FIG. 3 is a cross-sectional view of a cross-sectional view of a turning optical assembly having a reduced thickness compared to the assembly shown in FIG. 2.

The simplest method for reducing the thickness of the turning optic shown in FIG. 2 is to collapse the mirror in a manner analogous to that used in collapsing a lens to generate a Fresnel lens. A portion of such a turning mirror 100 is shown in FIG. 3 at 100. Mirror 100 has a plurality of facets 102 inclined at the same angle, $\beta$, as mirror 20 shown in FIG. 2. Each mirror facet 102 reflects the light generated by a small portion of the display into the viewer's pupil. This arrangement converts the narrow apertures defined by each of the facets into a sample from a corresponding wide aperture without losing any of the light generated by the display.

While this arrangement substantially reduces the thickness of the turning optic, it introduces unacceptable intensity variations across the field of view. The ratio of the narrow to wide apertures is equal to A/B. This quantity will be referred to as the fill factor in the following discussion. It can be shown that when a uniformly illuminated display is viewed, the fill factor is proportional to the perceived light intensity in the wide aperture. In the arrangement shown in FIG. 3, the fill factor varies by over a factor of 7 across the field of view when realistic values are used for the size of the viewer's pupil and eye relief. While such a variation might be acceptable in some situations, in general, such variations in intensity are not desirable.

The preferred embodiment of the present invention avoids this variation in fill factor by varying the positions of the facets shown in FIG. 3 such that the fill factor is substantially constant across the field of view. In the embodiment shown in FIG. 3, the facets may be viewed as being mounted on a planar surface such that the distance from the facets to the user's eye is constant. In the preferred embodiment of the present invention, the facets are mounted on a curved surface. The angle of each facet remains the same, i.e., β. The surface is computed by requiring the fill factor to be constant across the field of view. It can be shown that the surface is approximated by the curve $$y(x) = 0.5\left(\sqrt{2x^2 + a^2} - a\right)$$

where a is the distance from the center of the user's pupil to the nearest point on the curve. The coordinate system in which x and y are defined is shown in FIG. 4.

Figure 4:
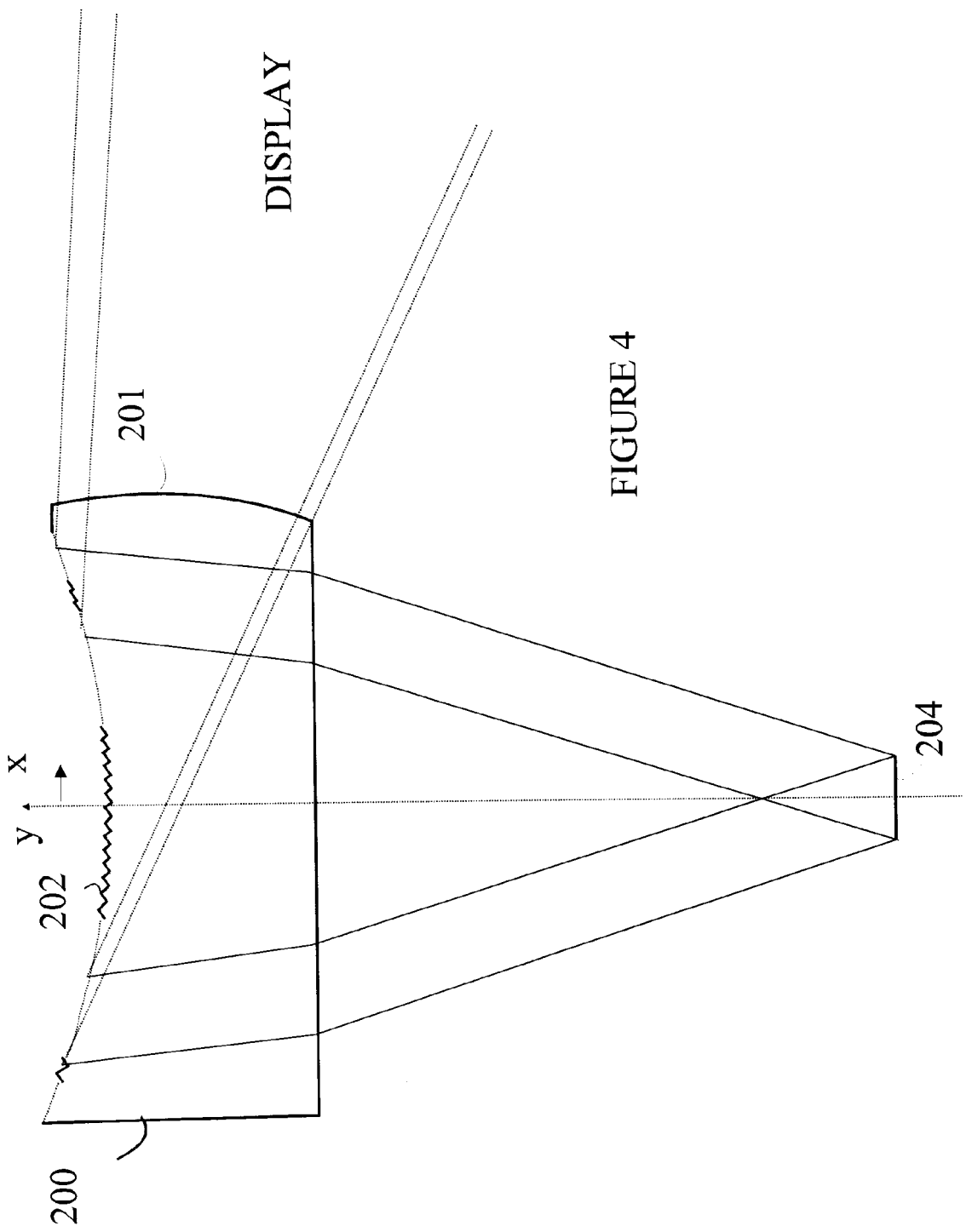
FIG. 4 is a cross-sectional view of a turning optical assembly according to the present invention.

Refer now to FIG. 4 which is a cross-sectional view of a turning optic 200 according to the present invention. Turning optic 200 is preferably constructed from a transparent material having an index of refraction greater than 1 so that lens 201 can be incorporated into the turning optic. However, embodiments that utilize a separate lens associated with the display and which are filled with air will also function satisfactorily. The surface of turning optic 200 opposite to the user's pupil 204 is curved and includes a plurality of facets 202 for reflecting light from the display into the user's pupil. Each of the facets is inclined at the same angle with respect to the y-axis. The curvature is chosen such that the fill factor is substantially constant across the turning optic.

In the preferred embodiment of the present invention, the turning optic has a cylindrical geometry, i.e., the facets are long planar surfaces similar to a set of venetian blinds disposed on a cylindrical surface having an approximately hyperbolic cross-section. However, embodiments in which the curved surface is not cylindrical will also be apparent to those skilled in the art from the preceding discussion. In this case, the surface would also be chosen to minimize variations in the fill factor in the direction perpendicular to the x and y directions shown in FIG. 4. Here, the planes of all of the facets must still be parallel to one another to avoid "ghost" images.

While the above described turning optic has been described in terms of reflecting light into the pupil of a human observer, it will be apparent to those skilled in the art from the preceding discussion that the present invention may be utilized in other situations in which light is to be reflected into an aperture.

The above embodiments have been described in terms of a curved surface chosen such that the fill factors associated with each of the facets is the same. However, it will be apparent to those skilled in the art that the fill factors can vary somewhat if the resultant variation in image intensity is tolerable.

Various modifications to the present invention will become apparent to those skilled in the art from the foregoing description and accompanying drawings. Accordingly, the present invention is to be limited solely by the scope of the following claims.

What is claimed is:

1. An optical system comprising a first turning optic and a first display screen, said first turning optic comprising:

a plurality of planar facets disposed on a first surface opposite to a first aperture, the planes of said facets being parallel to one another; and an input port for receiving light from said first display screen and causing said light to impinge on said facets such that said light is reflected by said facets into said first aperture.

2. The optical system of claim 1 wherein said first surface comprises a curved surface having a curvature chosen such that the fill factor for each of said facets is substantially the same as the fill factors for the others of said facets.

3. The optical system of claim 2 wherein said curved surface comprises a cylinder having a hyperbolic cross-section.

4. The optical system of claim 1 further comprising a frame, a second turning optic and a second display screen, said second turning optic comprising:

a plurality of planar facets disposed on a second surface opposite to a second aperture, the planes of said facets being parallel to one another; and an input port for receiving light from said second display screen and causing said light to impinge on said facets such that said light is reflected by said facets into said second aperture, said first optic, said first display screen, said second optic and said second display screen being mounted on said frame so as to position said first and second optics respectively over the eyes of a person wearing said frame, said first and second apertures being coincident with the left and right pupils of said person's eyes, respectively.

5. The optical system of claim 4 wherein said second surface comprises a curved surface having a curvature chosen such that the fill factor for each of said facets is substantially the same as the fill factors for the others of said facets.

6. An optical system for reflecting light from a display screen into an aperture, said optical system comprising:

a plurality of planar facets disposed on a curved surface opposite to said aperture, the planes of said facets being parallel to one another; and an input port for receiving light from said display screen and causing said light to impinge on said facets such that said light is reflected by said facets into said aperture, wherein said curved surface has a curvature chosen such that the fill factor for each of said facets is substantially the same as the fill factors for the others of said facets.

7. The optical system of claim 6 wherein said curved surface comprises a cylinder having a hyperbolic cross-section.

* * * * *